United States Patent
Ho

(10) Patent No.: US 10,309,579 B1
(45) Date of Patent: Jun. 4, 2019

(54) ADJUSTABLE SUPPORT DEVICE FOR DISPLAY

(71) Applicant: Oxti Corporation, Taipei (TW)

(72) Inventor: Chih Feng Ho, Taipei (TW)

(73) Assignee: Oxti Corporation, Chungho, Taipei (TW)

( * ) Notice: Subject to any disclaimer, the term of this patent is extended or adjusted under 35 U.S.C. 154(b) by 0 days.

(21) Appl. No.: 15/889,411

(22) Filed: Feb. 6, 2018

(51) Int. Cl.
*F16M 11/00* (2006.01)
*F16M 11/18* (2006.01)
*G05D 3/10* (2006.01)
*F16M 11/04* (2006.01)

(52) U.S. Cl.
CPC ........... *F16M 11/18* (2013.01); *F16M 11/046* (2013.01); *G05D 3/10* (2013.01)

(58) Field of Classification Search
CPC .............. F16M 11/24; F16M 2200/048; Y10S 248/917
See application file for complete search history.

(56) References Cited

U.S. PATENT DOCUMENTS

| | | | |
|---|---|---|---|
| 5,758,849 A | 6/1998 | Bui | |
| 6,213,438 B1 | 4/2001 | Ostby et al. | |
| 6,766,994 B2 | 7/2004 | Serbinski et al. | |
| 6,796,537 B1 | 9/2004 | Lin | |
| 6,863,252 B2 | 3/2005 | Bosson | |
| 7,413,152 B1 | 8/2008 | Chen | |
| 7,628,552 B2 | 12/2009 | Coppola | |
| 7,644,039 B1* | 1/2010 | Magee | G06Q 20/1085 221/9 |
| 7,644,897 B2 | 1/2010 | Shin | |
| 7,722,003 B2 | 5/2010 | Ishizaki et al. | |
| 7,845,747 B2 | 8/2010 | Gan et al. | |
| 7,789,355 B2* | 9/2010 | Gan | F16M 11/105 248/157 |

* cited by examiner

*Primary Examiner* — Amy J. Sterling
(74) *Attorney, Agent, or Firm* — Charles E. Baxley

(57) ABSTRACT

A support device includes a transmission device attached to a housing and having a carrier slidably attached to the housing, a driving device connected to the carrier for driving and moving the carrier up and down relative to the housing, an object attached to the carrier, a sensor element attached to the object for detecting an approaching of a user toward the object, a sensor member disposed close to the housing for detecting the approaching of the user toward the object, and a control device connected to the sensor element and to the sensor member for receiving signals from the sensor element and the sensor member, and the control device is connected to the driving device for driving and moving the carrier and the object relative to the housing to a selected position.

5 Claims, 8 Drawing Sheets

ADJUSTABLE SUPPORT DEVICE FOR DISPLAY

BACKGROUND OF THE INVENTION

1. Field of the Invention

The present invention relates to a support device, and more particularly to an automatic and adjustable support device including an adjustable structure or mechanism for adjusting a carrier and/or various objects, such as monitors, displays, keyboards, antenna members, or the like, relative to a supporting stand automatically, and for allowing the monitor or object to be adjusted relative to and toward a user and for allowing the monitor or object to be easily actuated or operated by the user.

2. Description of the Prior Art

Various kinds of typical carriers or support devices have been developed and comprise a supporting member or carrier member attached or mounted or supported on a supporting stand and for supporting various objects, such as monitors, displays, keyboards, antenna members, or the like.

For example, U.S. Pat. No. 5,758,849 to Bui et al., U.S. Pat. No. 6,213,438 to Ostby et al., U.S. Pat. No. 6,766,994 to Serbinski et al., U.S. Pat. No. 6,796,537 to Lin, U.S. Pat. No. 6,863,252 to Bosson, U.S. Pat. No. 7,413,152 to Chen, U.S. Pat. No. 7,628,552 to Coppola, U.S. Pat. No. 7,644,897 to Shin, U.S. Pat. No. 7,722,003 to Ishizaki et al., and U.S. Pat. No. 7,784,747 to Gan et al. disclose several of the typical support devices or carrier devices each also comprising a support member or carrier member pivotally or rotatably attached or mounted or coupled to a supporting stand with one or more pivotal arms for supporting various objects, such as monitors, displays, keyboards, antenna members, or the like.

However, normally, the support members or carrier members and the pivotal arms and the supporting stands include a rather complicated structure or configuration and are pivotally or rotatably coupled together with pivot joints or axles and are adjustable to different angular positions by a frictional force between the members or elements that may not solidly and stably support the carrier and the objects in place, and the supporting stands normally include a structure or configuration that may not be used to solidly and stably support the support members or carrier members in the required position. In addition, the typical support devices or carrier devices may only be adjusted manually, but may not be adjusted automatically.

The present invention has arisen to mitigate and/or obviate the afore-described disadvantages of the conventional support devices for monitors, displays, keyboards, antenna members, or other display apparatuses.

SUMMARY OF THE INVENTION

The primary objective of the present invention is to provide a stable support device including an adjustable structure or mechanism for adjusting a carrier and/or various objects, such as monitors, displays, keyboards, antenna members, or the like, relative to a supporting stand automatically, and for allowing the monitor or object to be adjusted relative to and toward a user and for allowing the monitor or object to be easily actuated or operated by the user.

In accordance with one aspect of the invention, there is provided a support device comprising a housing including a chamber formed therein, a transmission device attached to the housing, the transmission device including a carrier slidably attached to the housing and moveable up and down relative to the housing, and the transmission device including a driving device connected to the carrier for driving and moving the carrier up and down relative to the housing, an object or display attached to the carrier and supported on the carrier, a sensor element attached to the object for detecting an approaching of a user toward the object, a sensor member disposed close to the housing for detecting the approaching of the user toward the object, and a control device connected to the sensor element and to the sensor member for receiving signals from the sensor element and the sensor member, and the control device being connected to the driving device for driving and moving the carrier up and down relative to the housing and for moving the object to a selected position relative to the user, and for allowing the monitor or object to be adjusted relative to and toward a user and for allowing the object or display to be easily actuated or operated by the user.

The transmission device includes a screw rotatably supported in the chamber of the housing, the carrier is threaded and engaged with the screw for allowing the carrier to be moved up and down relative to the housing with the screw. The sensor member is selected from a sensor mat supported on a ground and disposed and located close to the housing for detecting the approaching of the user toward the object.

The transmission device includes a bearing member engaged in the housing and engaged with the screw for rotatably supporting the screw in the chamber of the housing. The driving device is engaged with the screw for rotating and driving the screw relative to the housing.

The housing includes an elongated passage formed therein and communicating with the chamber of the housing, the carrier includes an extension extended therefrom and slidably engaged in the passage of the housing for guiding and limiting the carrier to move up and down relative to the housing and for preventing the carrier from being rotated relative to the housing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
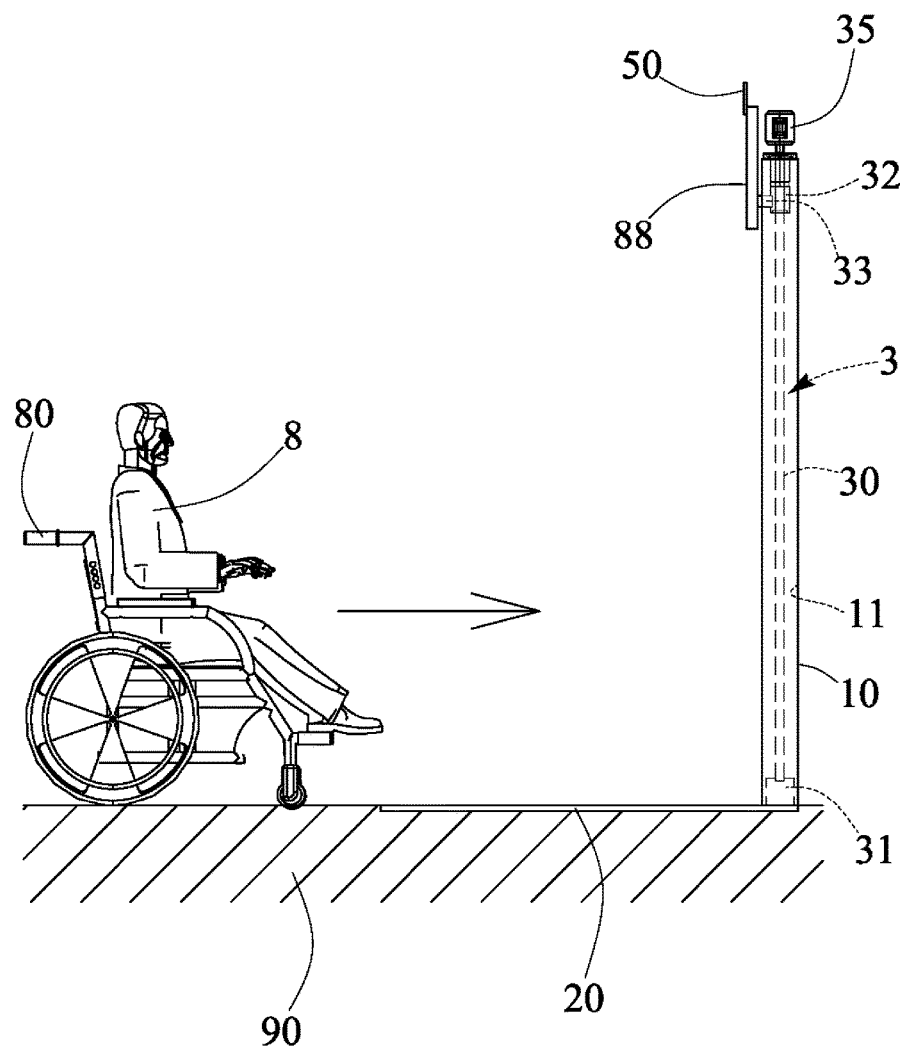
FIG. 1 is a side plan schematic view illustrating an operation of a stable and automatic and adjustable support device in accordance with the present invention.

Referring to the drawings, and initially to FIGS. 1-7, an adjustable support device in accordance with the present invention comprises a stationary base or column or housing 10 including an elongated or longitudinal compartment or chamber 11 formed therein, and including an elongated or longitudinal slot or passage 12 formed therein and communicating with the chamber 11 thereof. A detector or sensor member 20, such as a sensor mat 20 is disposed or supported on the ground 90, and is attached or mounted or secured to the housing 10 and/or disposed or arranged or located close to the housing 10, such as disposed or located in front of the housing 10, for detecting the appearance or approaching of the user 8 toward or relative to the sensor mat or sensor member 20 and/or the housing 10.

A moving or transmission device 3 includes a spindle or bolt or screw 30 pivotally or rotatably received or engaged in the chamber 11 of the housing 10, and pivotally or rotatably attached or mounted or supported in the chamber 11 of the housing 10 with a flange bearing member 31 or the like, for allowing the screw 30 to be pivoted or rotated relative to the housing 10, in which the bearing member 31 is attached or mounted or secured to and engaged in the lower or bottom portion of the housing 10. A follower or carrier 32 is attached or mounted or secured to or threaded or engaged with the screw 30 for allowing the carrier 32 to be slidably attached to the housing 10 and to be moved up and down relative to the housing 10 (FIGS. 1-5) when the screw 30 is pivoted or rotated relative to the housing 10.

The carrier 32 includes a bar or extension 33 extended therefrom and slidably received or engaged in the passage 12 for guiding and limiting the carrier 32 to move up and down relative to the housing 10 only and for preventing the carrier 32 from being pivoted or rotated relative to the housing 10. A driving device 35, such as a servo motor, driving motor 35 or the like is provided and attached or mounted or secured to the housing 10, and connected or coupled to the screw 30 for pivoting or rotating or driving the screw 30 relative to the housing 10, and thus for moving or driving the carrier 32 to move up and down relative to the housing 10. The carrier 32 may be provided for engaging with and for supporting various objects 88 (FIGS. 1-7), such as monitors, displays, keyboards, antenna members, desktop display screens, touch screens or the like.

Figure 8:
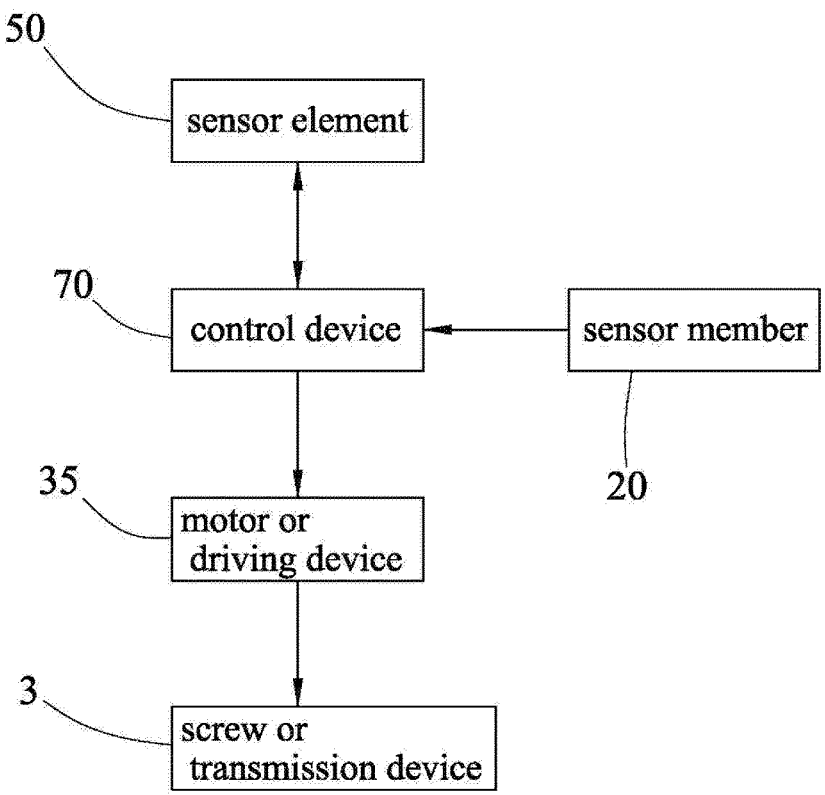
FIG. 8 is a block diagram illustrating the operating system for the adjustable support device.

Another or second detector or sensor member or sensor element 50, such as a camera, an object sensor, a depth image sensor, a 3D image sensor, a Charge Coupled Device (CCD), a Complementary Metal-Oxide Semiconductor (CMOS), or the like is attached or mounted or secured to the monitor or object 88 and/or to the carrier 32 and/or to the housing 10 for detecting the appearance or approaching of the user 8 toward or relative to the object 88 and/or the carrier 32 and/or the housing 10, and a processor device or control device 70 (FIG. 8), such as a Central Processing Unit (CPU), a Programmable Logic Controller (PLC) or the like is further provided and electrically connected or coupled to the sensor element 50 and/or the sensor member 20 and/or the driving motor or driving device 35 with a wire or cable or remotely, for receiving signals from the sensor element 50 and/or the sensor member 20.

For example, when or after the control device 70 has received the signals from the sensor element 50 and/or the sensor member 20, the control device 70 that is electrically connected or coupled to the driving device 35 may actuate or operate or control the driving device 35 to pivot or rotate or drive the screw 30 relative to the housing 10, and thus for moving or driving the carrier 32 and/or the object 88 and/or the sensor element 50 to move up and down relative to the housing 10 to the best or selected position relative to the user 8.

Figure 2:
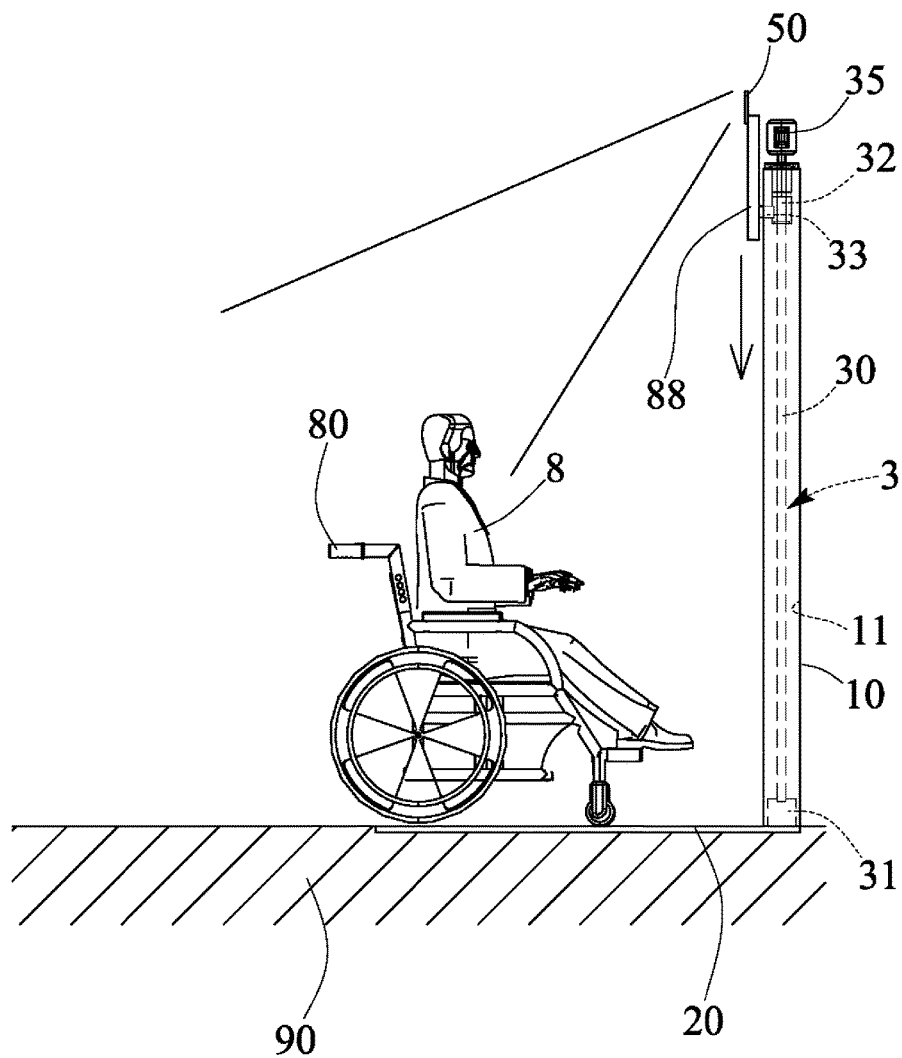
FIGS. 2, 3, 4 are side plan schematic views similar to FIG. 1, illustrating the operation of the adjustable support device.
Figure 3:
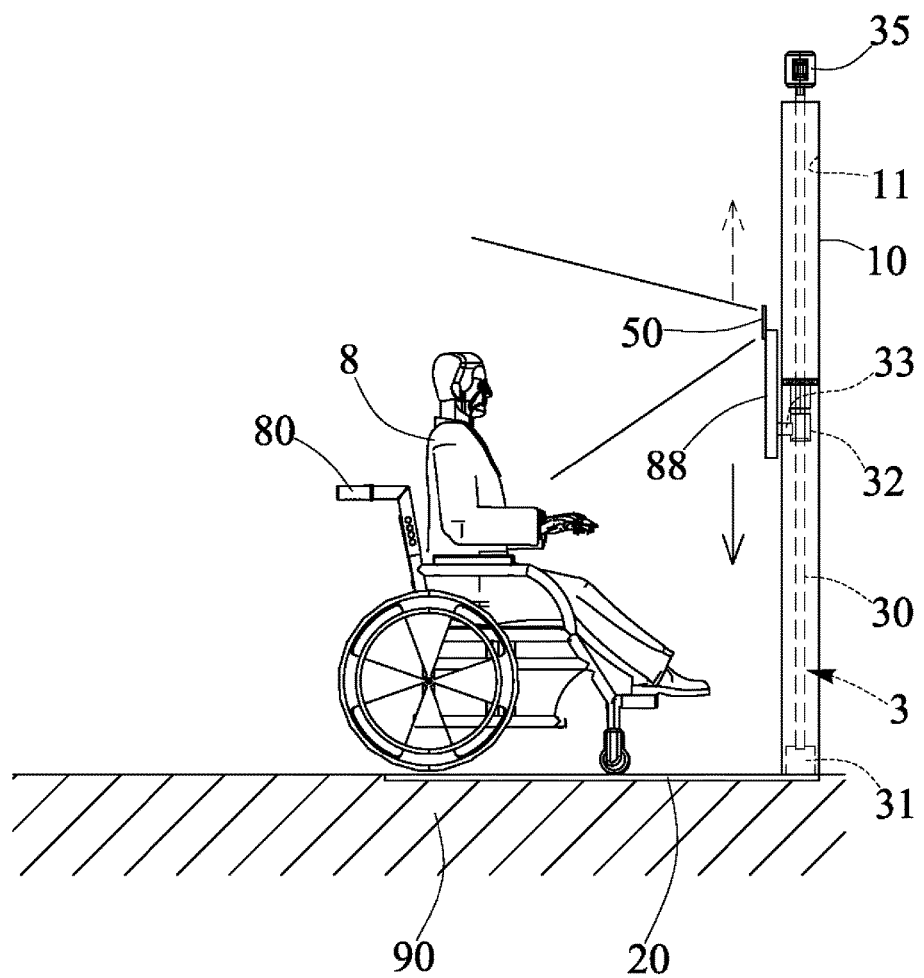
Figure 4:
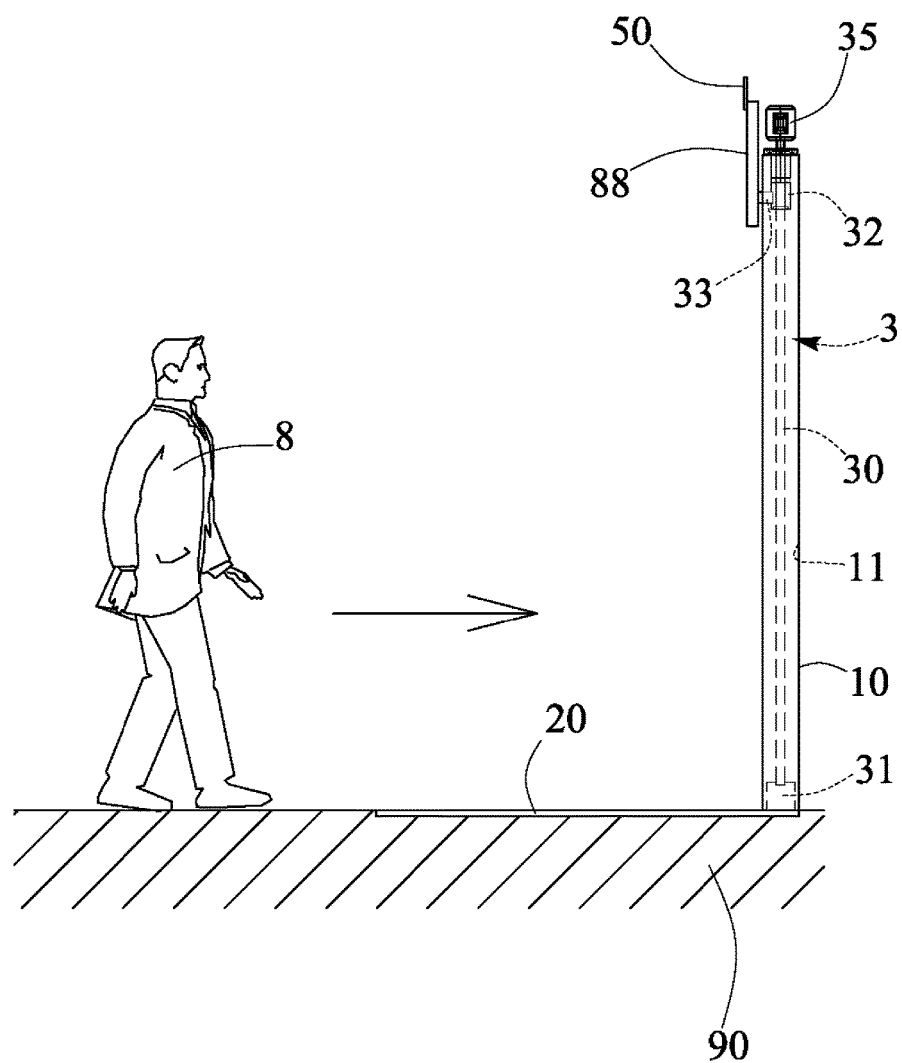
Figure 5:
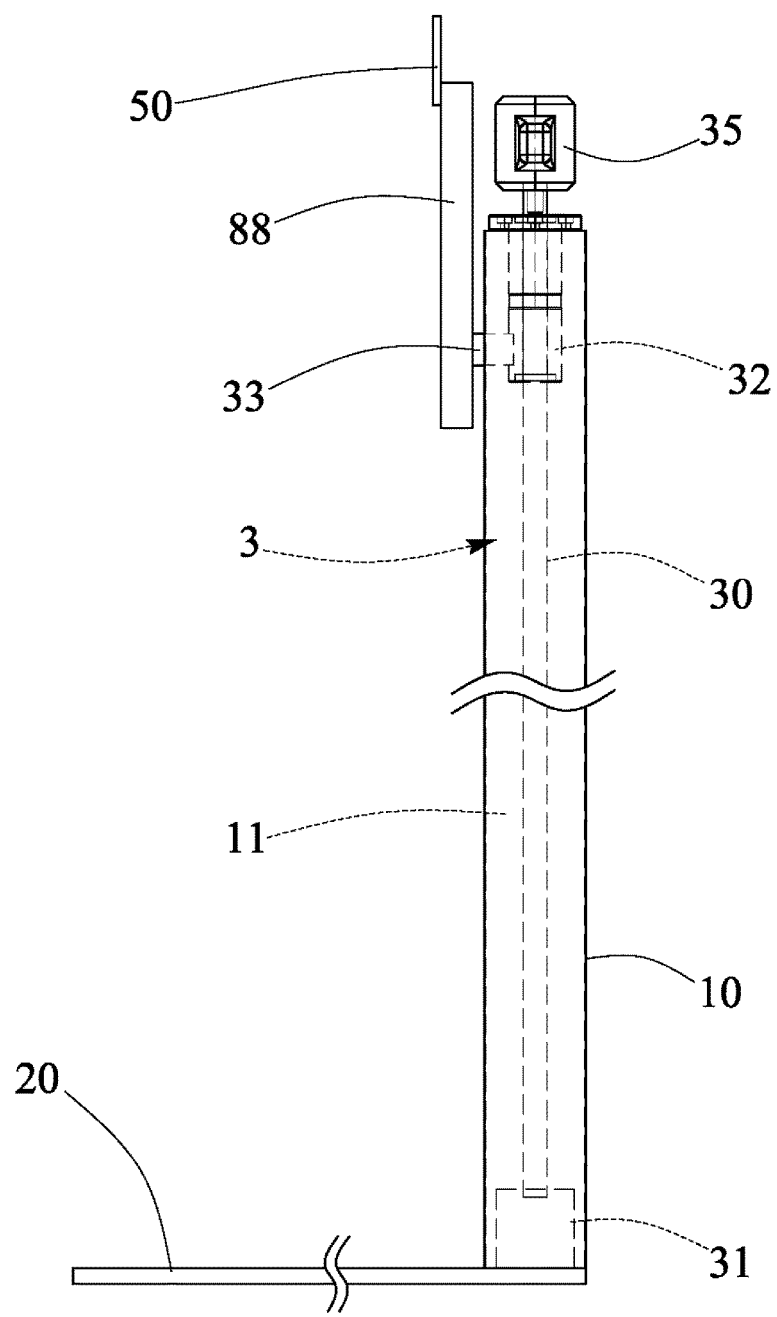
FIG. 5 is an enlarged side plan schematic view of the adjustable support device.
Figure 6:
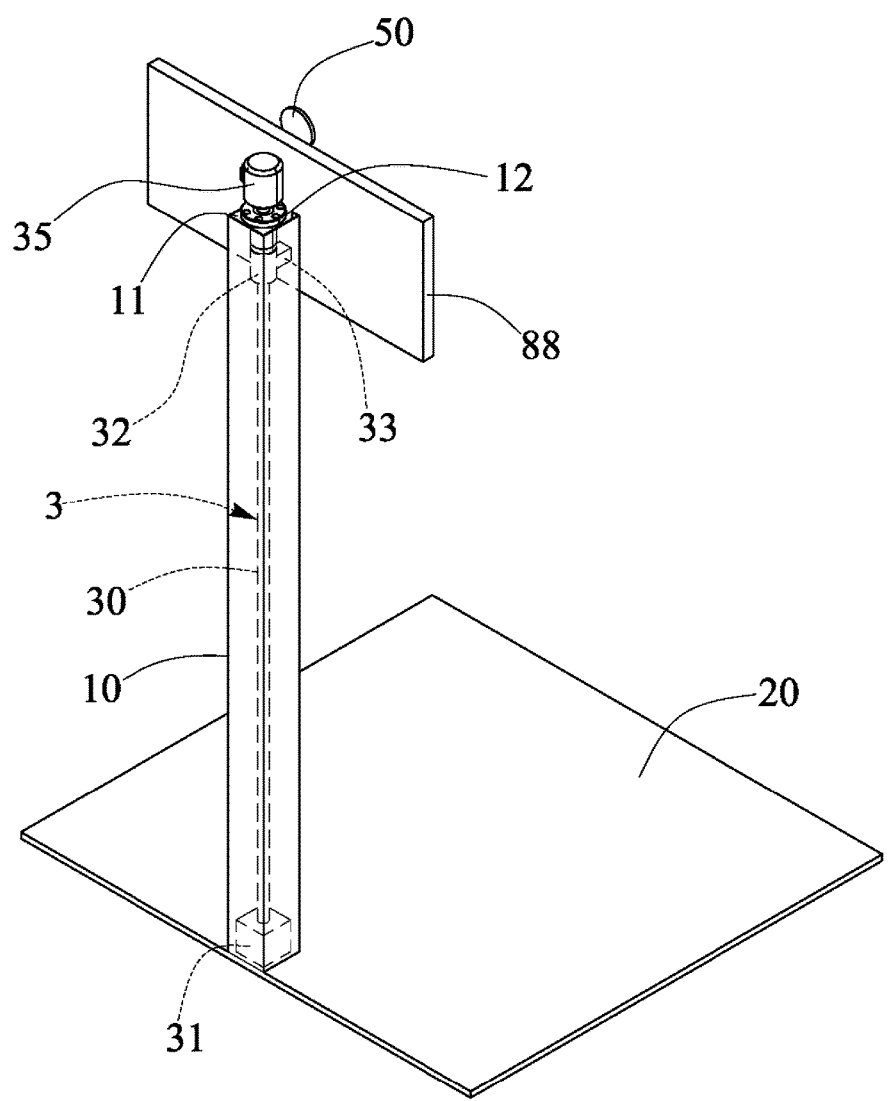
FIG. 6 is a perspective view of the adjustable support device.
Figure 7:
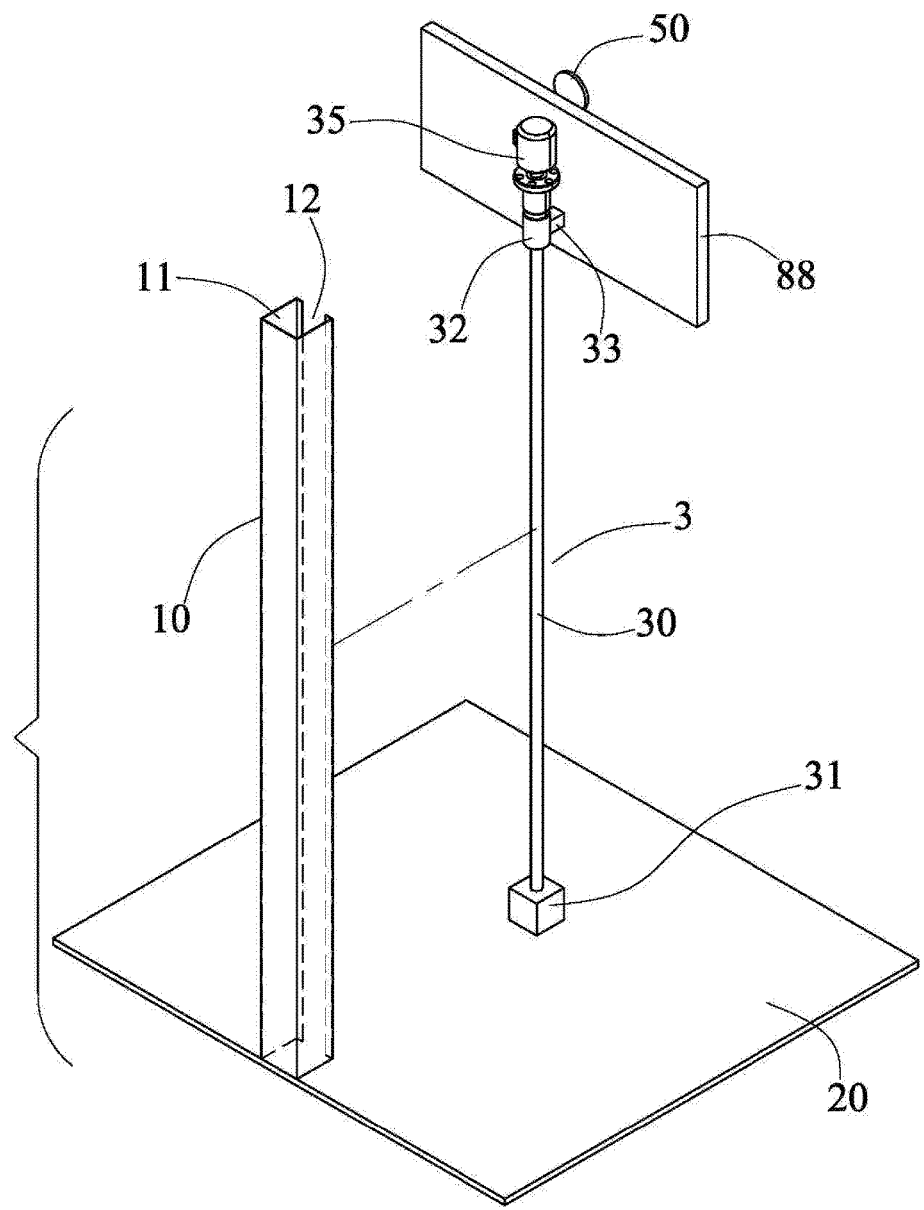
FIG. 7 is a partial exploded view of the adjustable support device.

In operation, as shown in FIGS. 1-3, when the user 8 who is seated on a wheel chair 80 or the like is appearing or approaching toward or relative to the object 88 and/or the carrier 32 and/or the housing 10, or when the user 8 is walking and appearing or approaching toward or relative to the object 88 and/or the carrier 32 and/or the housing 10 (FIG. 4), either or both of the sensor element 50 and the sensor member 20 may detect the appearance and/or the approaching of the user 8 toward or relative to the object 88 and/or the carrier 32 and/or the housing 10, and may then send the detected signals to the control device 70, the control device 70 may then actuate or operate the driving device 35 to pivot or rotate or drive the screw 30 relative to the housing 10, and to move or drive the carrier 32 and/or the object 88 and/or the sensor element 50 to move up and down relative to the housing 10 to the best or selected position relative to the user 8 and thus for allowing the desktop display screen, or the touch screen or the object 88 to be easily actuated or operated by the user.

Accordingly, the stable and adjustable support device in accordance with the present invention includes an adjustable structure or mechanism for adjusting a carrier and/or various objects, such as monitors, displays, keyboards, antenna members, desktop display screens, touch screens or the like, relative to a supporting stand automatically, and for allowing the monitor or object to be adjusted relative to and toward a user and for allowing the monitor or object to be easily actuated or operated by the user.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A support device comprising:
a housing including a chamber formed therein;
a transmission device attached to said housing, said transmission device including a carrier slidably attached to said housing and moveable up and down relative to said housing, and said transmission device including a driving device connected to said carrier for driving and moving said carrier up and down relative to said housing;
an object attached to said carrier and supported on said carrier;
a sensor element attached to said object for detecting an approaching of a user toward said object;
a sensor member disposed close to said housing for detecting the approaching of the user toward said object, said sensor member being selected from a sensor mat supported on a ground and disposed and located close to said housing; and
a control device connected to said sensor element and to said sensor member for receiving signals from said sensor element and said sensor member, and said control device being connected to said driving device for driving and moving said carrier up and down relative to said housing and for moving said object to a selected position relative to the user.

2. The support device as claimed in claim 1, wherein said transmission device includes a screw rotatably supported in said chamber of said housing, said carrier is threaded and engaged with said screw for allowing said carrier to be moved up and down relative to said housing with said screw.

3. The support device as claimed in claim 2, wherein said transmission device includes a bearing member engaged in said housing and engaged with said screw for rotatably supporting said screw in said chamber of said housing.

4. The support device as claimed in claim 2, wherein said driving device is engaged with said screw for rotating and driving said screw relative to said housing.

5. The support device as claimed in claim 1, wherein said housing includes an elongated passage formed therein and communicating with said chamber of said housing, said carrier includes an extension extended therefrom and slidably engaged in said passage of said housing for guiding and limiting said carrier to move up and down relative to said housing and for preventing said carrier from being rotated relative to said housing.

* * * * *